United States Patent
Yilmaz et al.

(10) Patent No.: US 10,123,211 B2
(45) Date of Patent: Nov. 6, 2018

(54) RESOURCE ALLOCATION AND INTERFERENCE MANAGEMENT FOR DENSE AND SMALL CELL DEPLOYMENTS

(71) Applicant: Nokia Technologies Oy, Espoo (FI)

(72) Inventors: Osman Yilmaz, Espoo (FI); Carl Wijting, Espoo (FI); Mikko Uusitalo, Helsinki (FI); Omer Anjum, Espoo (FI)

(73) Assignee: Nokia Technologies Oy, Espoo (FI)

( * ) Notice: Subject to any disclaimer, the term of this patent is extended or adjusted under 35 U.S.C. 154(b) by 85 days.

(21) Appl. No.: 15/103,580

(22) PCT Filed: Dec. 11, 2013

(86) PCT No.: PCT/US2013/074455
§ 371 (c)(1),
(2) Date: Jun. 10, 2016

(87) PCT Pub. No.: WO2015/088521
PCT Pub. Date: Jun. 18, 2016

(65) Prior Publication Data
US 2016/0295418 A1   Oct. 6, 2016

(51) Int. Cl.
*H04W 72/00* (2009.01)
*H04W 16/04* (2009.01)
*H04W 16/32* (2009.01)
*H04W 16/10* (2009.01)

(52) U.S. Cl.
CPC .......... *H04W 16/04* (2013.01); *H04W 16/32* (2013.01); *H04W 16/10* (2013.01)

(58) Field of Classification Search
CPC ... H04W 16/04; H04W 72/082; H04W 72/04; H04W 72/10; H04W 52/241; H04W 52/367; H04W 72/08; H04W 28/06; H04W 52/243
USPC .... 455/452.1, 522, 450, 452.2, 115.1, 422.1, 455/436, 443, 444, 447
See application file for complete search history.

(56) References Cited

U.S. PATENT DOCUMENTS

| | | | |
|---|---|---|---|
| 2011/0190003 A1* | 8/2011 | Hiltunen | H04W 72/085 455/452.1 |
| 2012/0040696 A1 | 2/2012 | Siomina et al. | |
| 2012/0309406 A1 | 12/2012 | Xu et al. | |

(Continued)

FOREIGN PATENT DOCUMENTS

| | | |
|---|---|---|
| EP | 1494491 A1 | 1/2005 |
| WO | 2012/104601 A1 | 8/2012 |
| WO | 2012/104606 A1 | 8/2012 |

OTHER PUBLICATIONS

Hou et al., "Cell-grouping Based Distributed Beamforming and Scheduling for Multi-cell Cooperative Transmission", IEEE 22nd International Symposium on Personal, Indoor and Mobile Radio Communications, Sep. 11-14, 2011, 6 pages.

(Continued)

*Primary Examiner* — Fred Casca
(74) *Attorney, Agent, or Firm* — Mintz Levin Cohn Ferris Glovsky and Popeo, P.C.

(57) ABSTRACT

Methods and apparatus, including computer program products, are provided for grouping cells according to traffic characteristics and allocating resources in time and/or frequency domain to the different groups and within the groups, allowing a partial overlap.

13 Claims, 6 Drawing Sheets

(56) References Cited

U.S. PATENT DOCUMENTS

| | | | |
|---|---|---|---|
| 2013/0078925 A1* | 3/2013 | Aguirre | H04W 4/021 |
| | | | 455/62 |
| 2013/0242812 A1 | 9/2013 | Khoryaev et al. | |
| 2014/0023050 A1* | 1/2014 | Seo | H04W 72/0486 |
| | | | 370/336 |

OTHER PUBLICATIONS

Bjornson et al., "Optimality Properties, Distributed Strategies, and Measurement based Evaluation of Coordinated Multicell Ofdma Transmission", IEEE Transactions on Signal Processing, vol. 59, No. 12, Dec. 2011, pp. 6086-6101.

Office action received for corresponding European Patent Application No. 13815889.4, dated Jun. 12, 2017, 3 pages.

International Search Report and Written Opinion received for corresponding Patent Cooperation Treaty Application No. PCT/US2013/074455, dated Dec. 11, 2013, 10 pages.

* cited by examiner

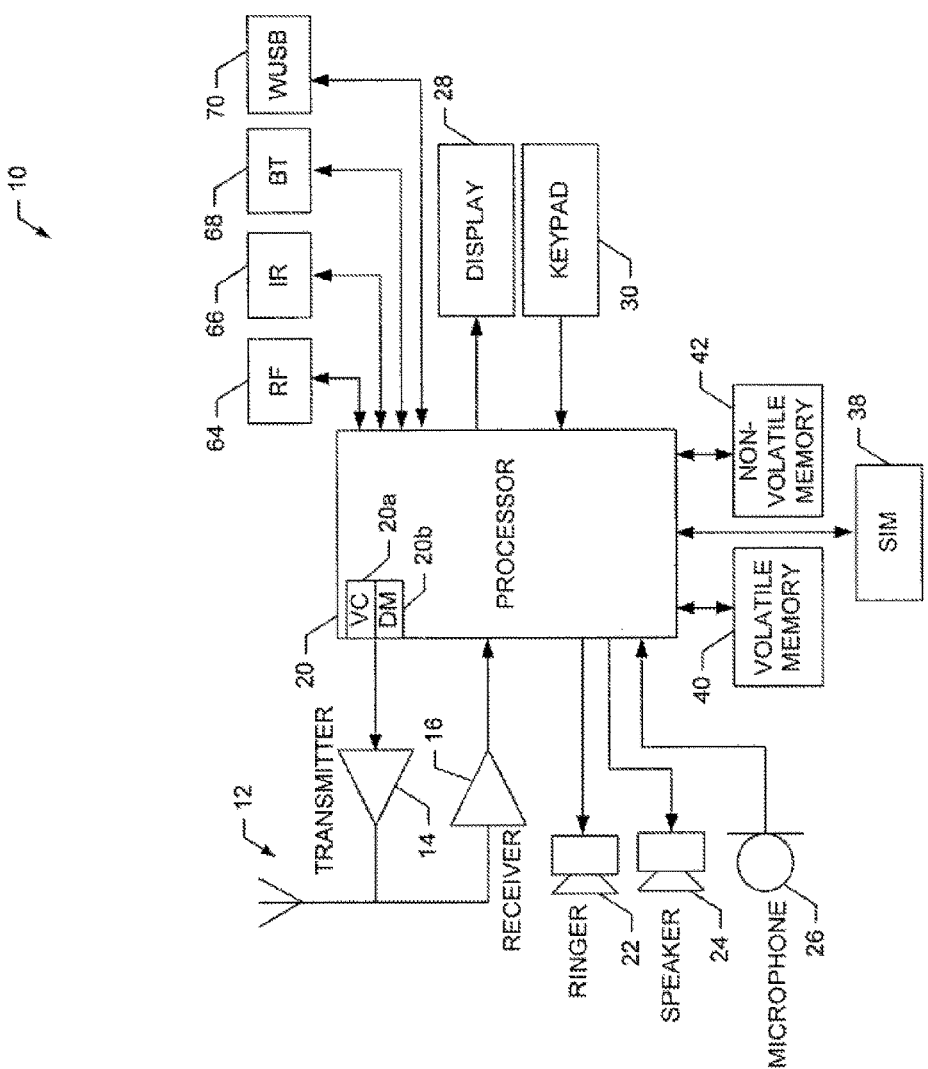

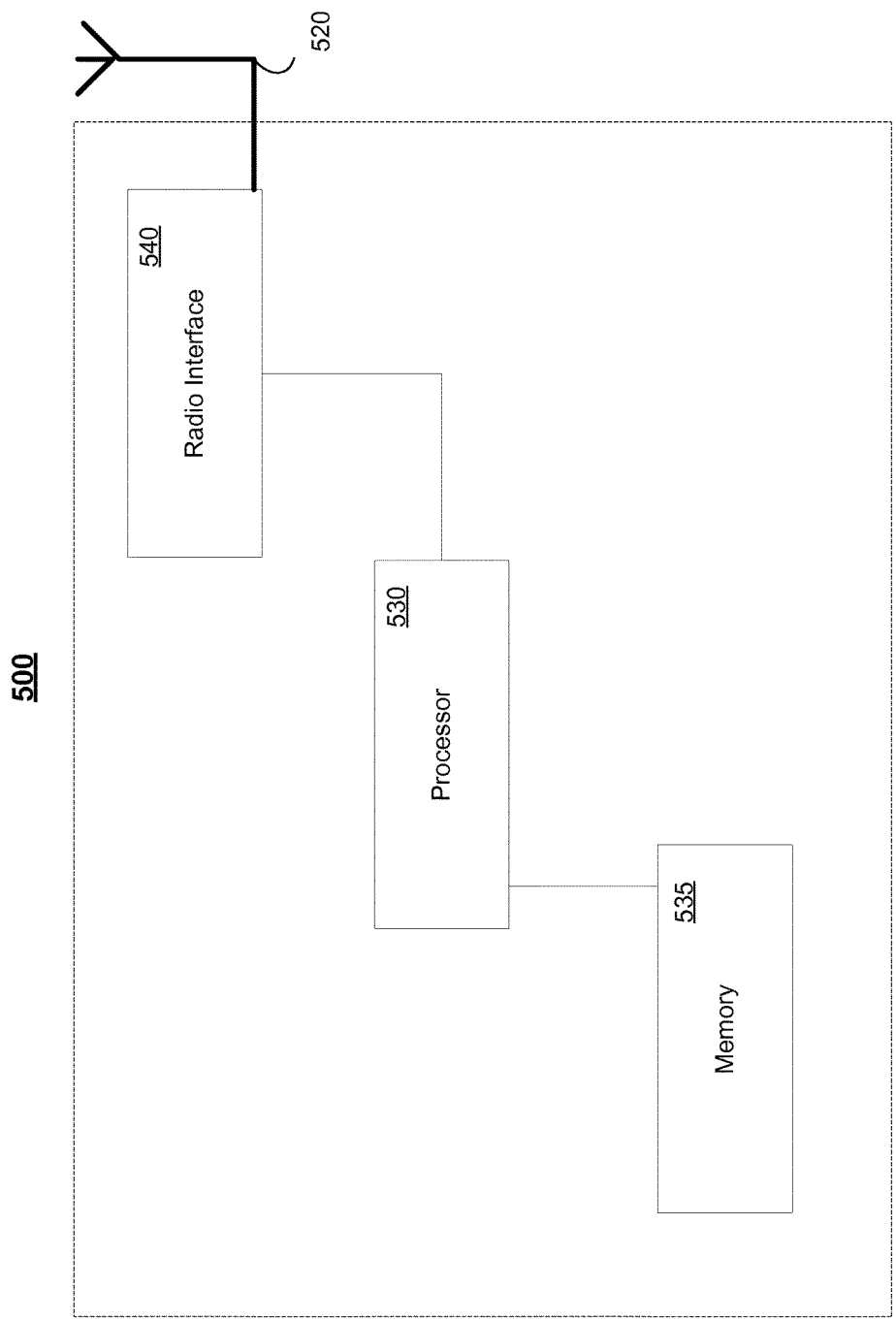

RESOURCE ALLOCATION AND INTERFERENCE MANAGEMENT FOR DENSE AND SMALL CELL DEPLOYMENTS

RELATED APPLICATION

This application was originally filed as Patent Cooperation Treaty Application No. PCT/US2013/074455 filed Dec. 11, 2013.

FIELD

The subject matter described herein relates to wireless communications.

BACKGROUND

The use of heterogeneous networks (HetNets) may provide opportunities for offloading traffic from macrocells to a typically higher capacity small cell. The heterogeneous network may include one or more wireless access points, or base stations, such as for example an E-UTRAN (evolved Universal Mobile Telecommunications System Terrestrial Radio Access Network) NodeB base station serving macrocells and one or more small cell base stations serving small cells. For example, a small cell base station (or a wireless access point or a remote radio head) may be implemented to cover a small cell, or coverage area, examples of which include a residence, a small business, a building, an office, or a small area. As such, the small cell base station, such as for example a home base station (HNB), a home E-UTRAN NodeB base station (HeNB), a WiFi access point, and the like, may be configured to have some of the functionality found in a typical base station, such as for example an E-UTRAN NodeB (eNB) base station, but the small cell base station may have less range and output power given its limited coverage area. For example, the small cell base station may be implemented as a wireless access point/femtocell base station having power sufficient for a cell serving wireless devices within a limited range of about tens of meters. Picocell base stations are another example of a small cell base station, but picocell base stations have somewhat greater range serving a small area on the order of about 100-200 meters. Accordingly, wireless service providers view small cell base stations as a way to extend service coverage, as a way to offload traffic to the small cell base stations, and/or as a way to provide enhanced service, such as for example higher data rates, lower latencies, energy efficiency and the like, within the small cell, when compared to the larger macrocell served by a typical base station, such as for example the eNB base station.

SUMMARY

Methods and apparatus, including computer program products, are provided for resource allocation including sharing among small cells.

In some example embodiments, there is provided a method. The method may include receiving one or more traffic characteristics for small cells of a cluster; and determining, for the cluster, at least one resource allocation group based on the received one or more traffic characteristics.

In some variations, one or more of the features disclosed herein including the following features can optionally be included in any feasible combination. The one or more traffic characteristics may include a resource utilization rate at each of the small cells. The one or more traffic characteristics may include a resource utilization rate for a traffic type. A first resource allocation group may include one or more small cells having similar traffic characteristics. A second resource allocation group may include one or more other small cells having similar traffic characteristics. The first resource group may be allocated, based on at least similar traffic characteristics and inter-cell interference, at least a partially overlapping resource in a time domain, a frequency domain, or a combination of both. The first resource allocation group may represent a group of small cells assigned to the first resource allocation group. The assigned group of small cells may not substantially interfere with each other. The assigned group of small cells may be allocated at least a partially overlapping resource in a time domain, a frequency domain, or a combination of both. The allocation may include sharing, by at least two small cell base stations, at least the partially overlapping resource among the assigned group of small cells. The size of the partially overlapping resource may be allocated based on at least the one or more traffic characteristics of the group of small cells.

The above-noted aspects and features may be implemented in systems, apparatus, methods, and/or articles depending on the desired configuration. The details of one or more variations of the subject matter described herein are set forth in the accompanying drawings and the description below. Features and advantages of the subject matter described herein will be apparent from the description and drawings, and from the claims.

DESCRIPTION OF THE DRAWINGS

In the drawings,

FIG. 4 depicts an example of a user equipment, in accordance with some example embodiments; and FIG. 5 depicts an example of a resource control node, in accordance with some example embodiments.

Figure 1C:
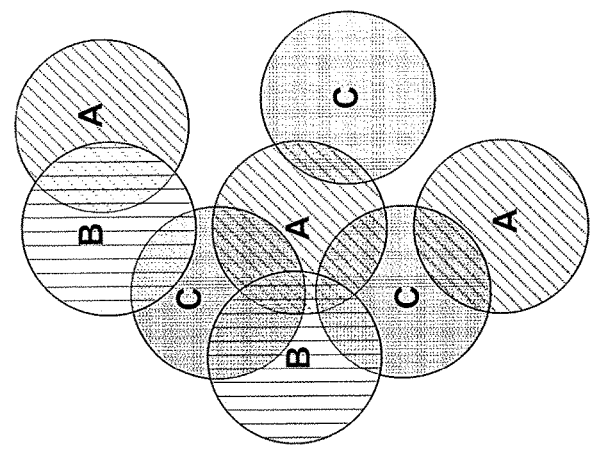
FIGS. 1(A)-1(C) depict an example cluster including eight small cells, in accordance with some example embodiments.

Like labels are used to refer to same or similar items in the drawings.

DETAILED DESCRIPTION

Small cells, such as picocells, femtocells, and the like, are being deployed with increasing frequency. Moreover, small cells may be densely deployed, without much in the way of detailed network planning. As such, network traffic distribution may change with the increasing deployment of small cells, which may also result in larger cell overlaps and more diverse and dynamic traffic distribution in ultra-dense small cell deployments, when compared to conventional macrocell deployments. In these small cell deployments, there may also be a scarcity of resource (given for example a relatively large frequency re-use factor among small cells) and/or substantial inter-cell interference (given for example co-channel small cell deployments).

In some example embodiments, the subject matter disclosed herein may form resource re-use groups of small cells based on the traffic characteristics in a cluster of small cells, so that the allocated resource(s) in the time domain (for example, a scheduled resource) and/or the frequency domain (for example, a carrier frequency) may be optimally utilized for each group. The resource re-use groups may refer to a group of small cells which may not strongly interfere with each other and may thus use at least partially overlapping resources in the time domain and/or the frequency domain. For example, a resource control node in the network may allocate, based on the re-use groups, resources in time and/or frequency to one or more small cells in a given group.

In some example embodiments, signaling may be standardized between resource control nodes configured to at least form resource re-use groups for a cluster of small cells and/or allocate resources to the re-use groups of the cluster. For example, resource control nodes may be distributed among small cell base stations, and these resource control nodes may signal to enable resources utilization among the re-use groups of small cells.

Figure 1B:
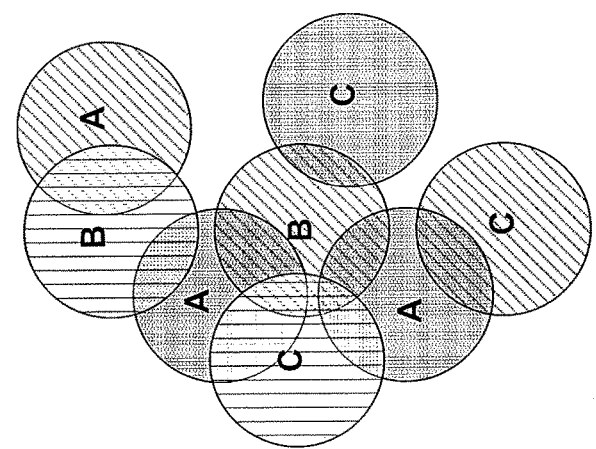
Figure 1A:
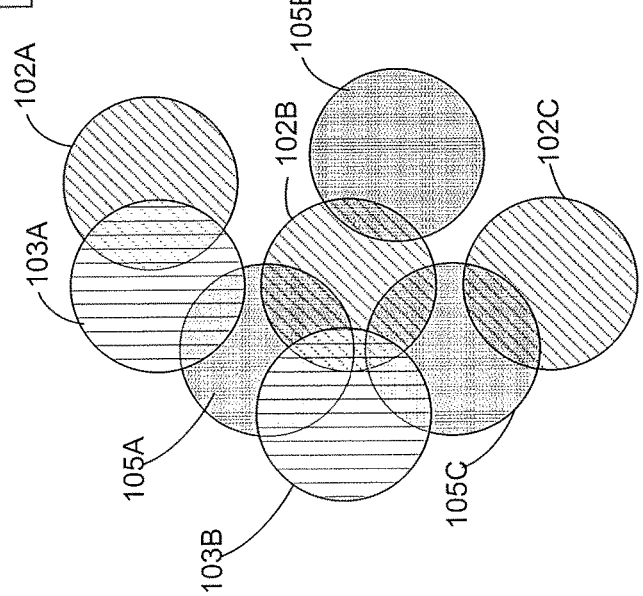

FIG. 1(A) depicts a resource control node 190 that forms a cluster of eight small cells in which resource re-use grouping is performed, in accordance with some example embodiments. The small cells may each be served by a small cell base station, and these small cells may have coverage (or interference) areas that overlap as shown by the overlapping regions of the small cells. Each small cell may have one or more user equipment, such as a smartphone, a cell phone, and the like.

In a cluster, the small cells may have different traffic characteristics as denoted by the different fill patterns at FIG. 1(A) and different interference zones (or coverage areas) as denoted by the circles in FIG. 1(A). FIG. 1(B) depicts cells having similar traffic characteristics in different resource groups before grouping by resource control node 190, while FIG. 1(C) depicts cells with similar characteristics grouped by resource control node 190 into one of the resource re-use groups, A, B, or C. For resource control node 190 may identify resource re-use groups A, B, C for the cluster of eight cells and the traffic characteristics that lead to the resource re-use grouping at FIG. 1(C), although other quantities of groups may be identified as well. The group labeled A may have similar traffic characteristics and may not radio interfere with each other; the group labeled B may have similar traffic characteristics and may not radio interfere with each other, and so forth.

Figure 2:
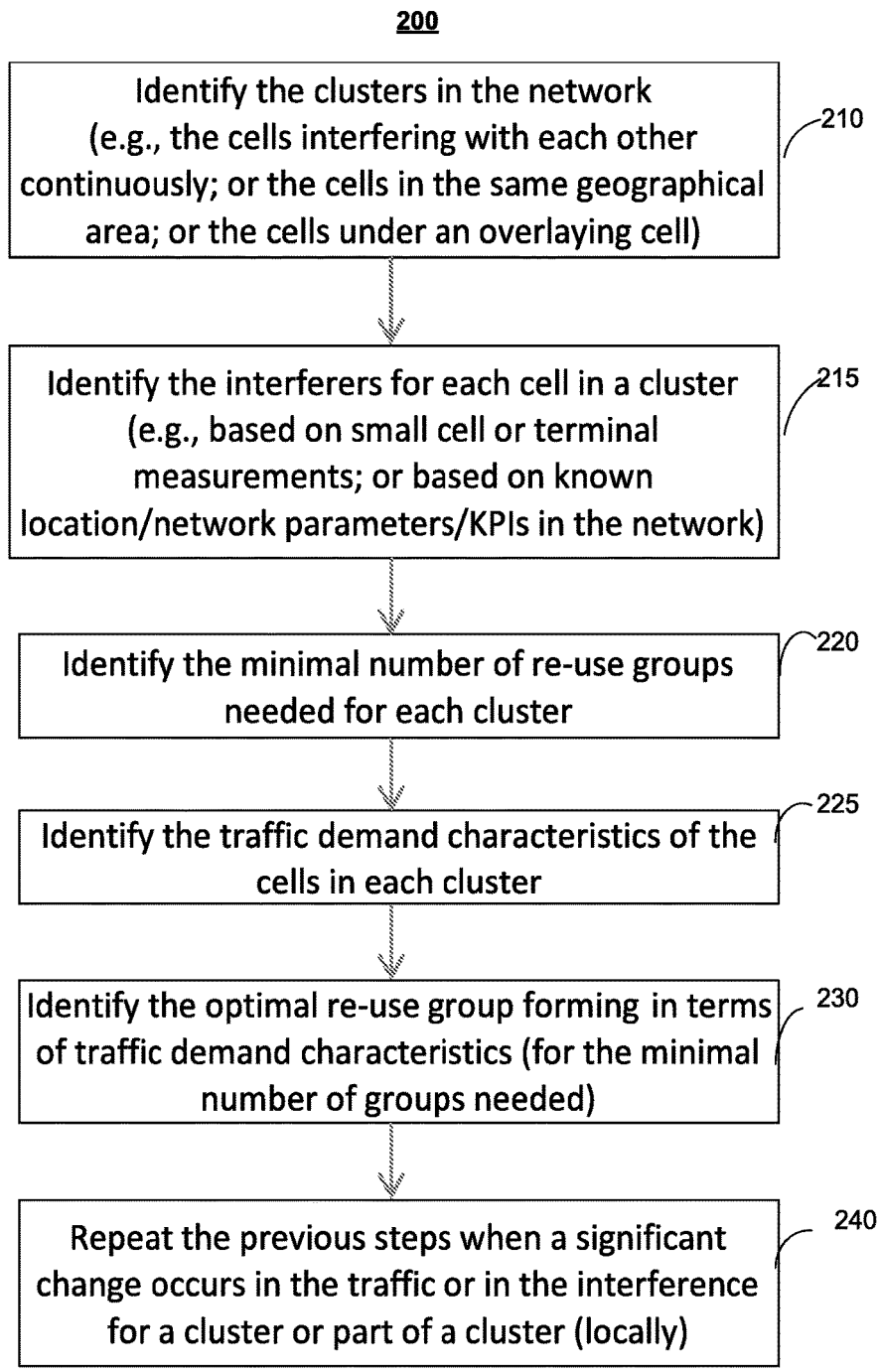
FIG. 2 depicts an example process for resource grouping in small cells, in accordance with some example embodiments.

FIG. 2 depicts an example process 200 for grouping small cells into resource re-use groups, accordance with some example embodiments. The description of FIG. 2 also refers to FIG. 1(C). The resource re-use groups may be used to allocate resources (including sharing of resources among cells) in the time and/or frequency domains. For example, a frequency carrier may be scheduled at the cells in group A at a given time. This resource may be allocated by network resource control node 190. For example, the network may allocate the carrier frequency at a given time to cells in group A, and/or the allocation may comprise a cell in group A sharing that resource with another cell in group A (or another cell from another group).

At 210, clusters in a network may be identified, in accordance with some example embodiments. A cluster may represent small cells that have overlaps, such as the eight cells depicted at FIGS. 1(a)-(c). For example, small cells that interfere with each other from time to time or continuously may be identified as part of a cluster. Similarly, small cells that are in the same or similar geographic region may be identified as part of a cluster. Furthermore, small cells within (or under) a larger cell may be identified as part of a cluster. Although the previous example described a cluster as a group of overlapping small cells, small cells having no overlap with other cells may also be formed into a cluster and processed in accordance with process 200 as well.

At 215, interferers for each cell in the cluster may be identified, in accordance with some example embodiments. For example, the radio interference state between a cell in a group and other cells in the group may be analyzed. Specifically, the interference state between cells in a group of a given cluster may be analyzed to ensure that the interference is relatively low (or non-existent).

At 220, a minimum number of re-use groups may be identified for each cluster, in accordance with some example embodiments. To optimize resource re-use efficiency, control node 190 may determine a minimal number of resource re-use groups. In the example of FIGS. 1(b)-(c), a minimal number of resource groups may be determined as three groups, A, B, and C, although other minimal number of re-use groups may be formed as well. In the case of cells 102B, 103B, and 105A, each cell is a potential interferer to the other. As such, three resource re-use groups may be needed for the given cluster of cells to avoid interference and allow re-use of resources.

In some example embodiments, if the same number of resource re-use groups can be formed for a cluster in several ways, small cells having similar traffic characteristics (in terms of resource rate utilization and/or resource rate utilization rate per traffic type) may be prioritized so that these small cells are included in the same re-use group. Moreover, the size of a band allocated to a resource re-use group may be determined based on the traffic characteristics of the re-use group.

At 225, traffic characteristics of the cells in each cluster may be identified, in accordance with some example embodiments. In the example of FIG. 1(A), the resource control node 190 may identify traffic demand characteristics for the eight small cells of the cluster at FIG. 1(A). The traffic demand characteristics may represent a cell's utilization rate of frequency resources and/or utilization rate for one or more traffic types handled at the cell. In the example of FIG. 1(A), small cells 102$a$-$c$ have the same fill pattern and thus have the same or similar traffic demand characteristics. Similarly, small cells 103$a$-$b$ have the same fill pattern and thus have the same or similar traffic demand characteristics, and small cells 105$a$-$c$ have the same fill pattern and thus have the same or similar traffic demand characteristics.

At 230, optimal re-use groups may be formed based on traffic demand characteristics for the minimal number of groups determined at 220, in accordance with some example embodiments. To find optimal re-use groups, the control node 190 may determine the re-use groups based on a similarity in the traffic demand characteristic between small cells. In the example of FIG. 1(C), the small cells labeled "A" may have the same or similar traffic demand characteristics. The small cells labeled B also have the same or similar traffic demand characteristics, and the small cells labeled C have the same or similar traffic demand characteristics.

To illustrate further, to find an optimal formation of resource re-use groups (for the minimum quantity of groups determined at 220), the resource control node 190 may analyze the traffic demand characteristics (for example, resource utilization rate, resource utilization rate per traffic type, such as voice, data, and the like) for each small cell of a cluster. This analysis may be used to form groups, so that small cells having similar traffic demand characteristics may be placed in the same group. For example, a resource re-use group that has demanding traffic characteristics may obtain a larger amount of resources (for example, frequency and/or time domain resources) to for example maximize traffic demand satisfaction in a network. In the example of FIG. 1(C), resource re-use group A (and the corresponding small cells therein) may, based on analyzed traffic characteristics, obtain a larger portion of the resources with respect to the resource re-use groups B and C.

In some example embodiments, the resource re-use groups of small cells may be formed by resource control node 190. This control node 190 may be implemented as for example a self-organizing network operation and maintenance module, a controlling macrocell/base station, a master small cell of a cluster of small cells that consists of group(s) of small cells, and any other network node including wireless access points and base stations. Moreover, the network control node 190 may be distributed among networks and network operators. In the case of coexistence under a Local Service Area (LSA), coordination of resources among re-use groups may be performed by a controller, such as a common LSA controller. When co-primary spectrum use is implemented, a negotiation via a direct interface may be used as well.

In some example embodiments, the resource re-use groups, such as groups A-C at FIG. 1(C), may be implemented with a single operator's network. However, the resource re-use groups may also be implemented between an operator and a group of local actors, such as shopping malls providing additional small cell connectivity and between operator networks (which may be under the control of one or more control nodes). In implementations where spectrum is shared between network operators or to enable co-existence between network operators, resource re-use groups may be implemented as well. For example, coexistence under shared spectrum may be under the control or authorization of a resource control node 190 comprising an LSA controller. To illustrate further, the resource re-use group formation of small cells may be used in the case of co-primary spectrum sharing between operators, where the traffic and interferer (and/or location and/or network parameters) information of the cells may need to be exchanged by the operators in order to provide efficient resource re-use group formation and spectrum allocation for the multi-operator scenario.

At 240, process 210-230 may be repeated to identify new groups when a change occurs in traffic characteristics or interference for a cluster or part of a cluster.

Once the clusters are formed, the small base stations serving the small cell may be allocated resources in the time and/or frequency domain based on the resource re-use groupings. For example, a first set of frequency carriers may be allocated to the small cells of group A, while a second set of frequency carriers may be allocated to the small cells of group B, and so forth. Moreover, resource allocation may also include resource sharing between cells/small cell base stations. For example, a small cell allocated a resources which is not being used may share that resources with another cell/small cell base station by signaling that other base station to indicate that the availability of the resource. The resource re-use groups may be allocated a single resource or many resources.

The bandwidth allocated for a resource re-use group may be based on the following: spectrum needed for the group to achieve a local optima (so-called group-based allocation); spectrum needed for a highest traffic demand/priority cell in a group (dominant cell-based allocation); and/or spectrum needed for the group to achieve a global optima (cluster-based allocation).

The resource allocation for each resource re-use group may be in the time domain (for example, a scheduled allocation) or the frequency domain (for example a frequency carrier). The resource allocation for a group may be an intra-band resource allocation. When this is the case, certain resources may be prioritized so that they are used in certain re-use groups. Resource allocation may also be carrier or band based as well.

In the example of FIG. 1(C), re-use groups A, B and C may partially re-use the resources of each other. Furthermore, the small cells that do not overlap with one or more groups (for example, an edge cell of a cluster) may be allocated with the additional resources of those non-overlapping cells.

In some example embodiments, signaling between resource control nodes may be used, and this signaling may be standardized to allow resource allocation including sharing to be performed between resource control nodes at small base stations.

In some example embodiments, the user equipment may detect the band being used in a given cluster, such as the resource being allocated and/or the schedule for the allocation in that cluster. For example, the user equipment may be configured to adjust to the part of the carrier frequency being used in the cell serving the user equipment. As such, the user equipment may determine which sub-bands are in use and/or dynamically adjust to the allowed frequency band. Moreover, the user equipment may be configured to receive only a relevant portion of the spectrum, and may ignore the portion(s) of the spectrum not used at the serving cell. When this is the case, baseband-level processing may only process part of the band, and/or the RF-level processing may only tune to the used portion of the band. Alternatively or additionally, explicit network signaling (for example, a message and the like) may indicate the used portion of the band, either in a broadcast manner or in a dedicated channel to the user equipment, when the user equipment enters a cell.

Figure 3A:
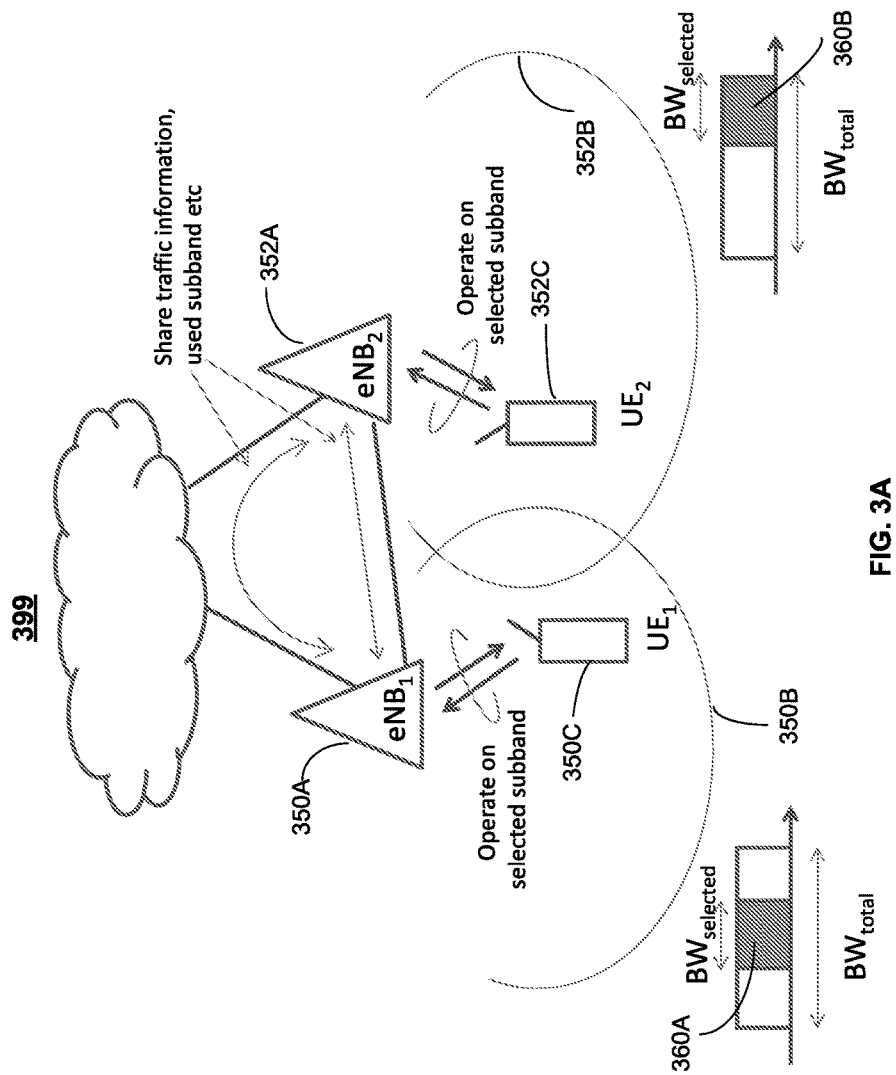
FIG. 3A depicts an example system for resource allocation, in accordance with some example embodiments.

FIG. 3A depicts an example of a system 399 including a first base station 350A serving a small cell 350B including a user equipment 350C. System 300 also includes a second base station 352A serving a small cell 352B including a user equipment 352C. In the example of FIG. 3A, the network may determine traffic characteristics for the one or more cells and form resource allocation groups based on the traffic characteristics and interference among cells. As such, a time and/or frequency domain resource may be allocated to each of the base stations/cells based on for example process 200 described above. In the example of FIG. 3A, the base station/cell may allocate a subband 360A, which is further allocated to user equipment 350C while in cell 350B. Moreover, the base station/cell may allocate a subband 360B, which is further allocated to user equipment 352C while in cell 352B.

Figure 3B:
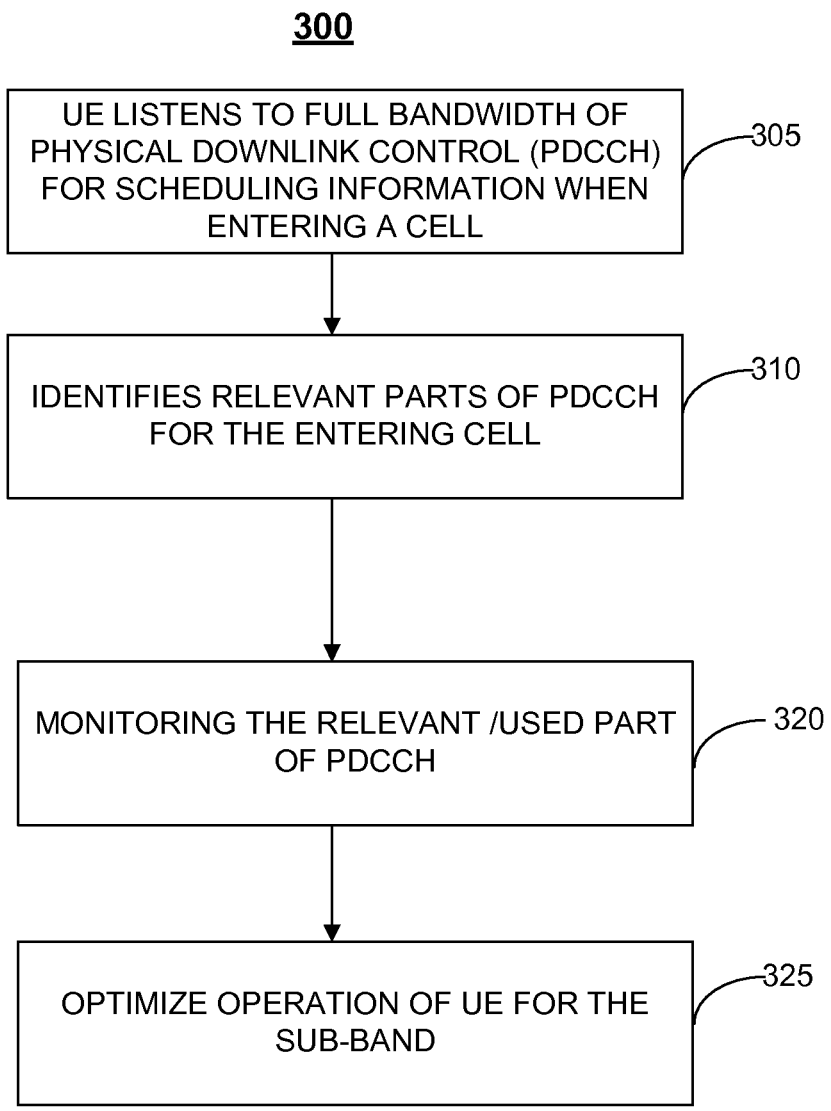
FIG. 3B depicts an example process for resource allocation at a user equipment, in accordance with some example embodiments.

FIG. 3B depicts an example process 300, in accordance with some example embodiments. The description of process 300 may also refer to FIG. 3A.

At 305, the user equipment may listen to the full bandwidth of the physical downlink control channel (PDCCH), when the user equipment enters a serving cell. For example, the user equipment 350C may initially listen to the full control channel (labeled BW total) as part of normal operation.

At 310, the user equipment may identify relevant portions of the PDCCH for the cell being entered into (or serving the user equipment). As such, the user equipment may determine that resource allocation/sharing as disclosed herein is being performed, in which case the user equipment may modify its behavior to take into account the resource allocation/sharing. For example, the used portion(s), such as portion 360A and the like, of the frequency spectrum may be indicated during resource allocation scheduling by the network, such as a base station (for example, an eNB base station or small cell base station). When this is the case, user equipment 305C may be configured (for example, via radio resource control signaling and the like) to only use the resources allocated in for example the PDCCH. The used portion(s) of the frequency spectrum may be derived from the presence of some signals in the used portion of the spectrum (for example, via synchronization signals or reference symbols), although the used spectrum may be broadcasted by a base station as well. Based on the band being used or not being used, the user equipment 350C may determine that only a part of the band, such as (sub)band 360A, is being used (for example, no common reference symbols are transmitted in the unused band). The network may explicitly signal (via, for example, a message) which subband(s) is in use in that cell, in which case the user equipment may not have to search the whole control PDDCH channel.

At 320, the user equipment may monitor the relevant/used portion of the PDCCH. For example, relevant control signaling may be transmitted in the used subband. As such, the user equipment only has to receive the relevant part and may thus ignore other parts.

At 325, the user equipment may optimize operation for the sub-band. For example, locations for searching primary synchronization signals/secondary synchronization signals (PSS/SSS) may be explicitly defined to enable operation in the subband. Alternatively or additionally, an overlay network (macro, evolved Node B base station, MeNB) may have a per cell radio resource allocation information for a given cluster. During a handover from an overlay network to an underlay network (small cell in a cluster), this information may also be provided to the user equipment by the overlay network.

In some example embodiments, a neighboring cell may provide the information about the used cell before a handover. All control signaling relevant in a cell may be transmitted in that part of the frequency band that is in use in that particular cell.

In some example embodiments, the small cells may be in an area where there is coverage from other cells (for example, a macro layer network). The user equipment may be connected to both the macro layer and the small cell layer using for example carrier aggregation (CA) or dual carrier. In CA mode, the macrocell may be the primary with all control information available and the small cell layer may be the secondary cell. The primary cell may signal to the user equipment which subchannel is used in the small cell layer/secondary cell. In the case of dual connectivity, the other layer may be used to signal the used subchannel in the small cell as well.

In some example embodiments, resource control node 190 may be distributed, so that a plurality of small cell base stations each include a resource control node. When this is the case, an available band/subband/resource of a low traffic small cell may be used by neighboring small cells. The low traffic small cell may enable the full utilization of its unused band/subband/resource by neighboring small cells only if they are in the same resource re-use group, although different resource re-use groups as well. As such, small cells may signal, as noted, its resource re-use group identifier and a resource request message, so that interference-free resource sharing may be enabled in dense small cell networks. For example, if the low traffic small cell is aware that neighboring cells are not in the same resource re-use group, then the low traffic small cell may not share the same resource with neighboring small cells.

FIG. 4 illustrates a block diagram of an apparatus 10, in accordance with some example embodiments. For example, apparatus 10 may comprise a user equipment, such as a smart phone, smart object, mobile station, a mobile unit, a subscriber station, a wireless terminal, a tablet, a wireless plug-in accessory, or any other wireless.

The apparatus 10 may include at least one antenna 12 in communication with a transmitter 14 and a receiver 16. Alternatively transmit and receive antennas may be separate.

The apparatus 10 may also include a processor 20 configured to provide signals to and receive signals from the transmitter and receiver, respectively, and to control the functioning of the apparatus. Processor 20 may be configured to control the functioning of the transmitter and receiver by effecting control signaling via electrical leads to the transmitter and receiver. Likewise, processor 20 may be configured to control other elements of apparatus 10 by effecting control signaling via electrical leads connecting processor 20 to the other elements, such as a display or a memory. The processor 20 may, for example, be embodied in a variety of ways including circuitry, at least one processing core, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits (for example, an application specific integrated circuit (ASIC), a field programmable gate array (FPGA), and/or the like), or some combination thereof. Accordingly, although illustrated in FIG. 4 as a single processor, in some example embodiments the processor 20 may comprise a plurality of processors or processing cores.

Signals sent and received by the processor 20 may include signaling information in accordance with an air interface standard of an applicable cellular system, and/or any number of different wireline or wireless networking techniques, comprising but not limited to Wi-Fi, wireless local access network (WLAN) techniques, such as Institute of Electrical and Electronics Engineers (IEEE) 802.11, 802.16, and/or the like. In addition, these signals may include speech data, user generated data, user requested data, and/or the like.

The apparatus 10 may be capable of operating with one or more air interface standards, communication protocols, modulation types, access types, and/or the like. For example, the apparatus 10 and/or a cellular modem therein may be capable of operating in accordance with various first generation (1G) communication protocols, second generation (2G or 2.5G) communication protocols, third-generation (3G) communication protocols, fourth-generation (4G) communication protocols, Internet Protocol Multimedia Subsystem (IMS) communication protocols (for example, session initiation protocol (SIP) and/or the like. For example, the apparatus 10 may be capable of operating in accordance with 2G wireless communication protocols IS-136, Time Division Multiple Access TDMA, Global System for Mobile communications, GSM, IS-95, Code Division Multiple Access, CDMA, and/or the like. In addition, for example, the apparatus 10 may be capable of operating in accordance with 2.5G wireless communication protocols General Packet Radio Service (GPRS), Enhanced Data GSM Environment (EDGE), and/or the like. Further, for example, the apparatus 10 may be capable of operating in accordance with 3G wireless communication protocols, such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The apparatus 10 may be additionally capable of operating in accordance with 3.9G wireless communication protocols, such as Long Term Evolution (LTE), Evolved Universal Terrestrial Radio Access Network (E-UTRAN), and/or the like. Additionally, for example, the apparatus 10 may be capable of operating in accordance with 4G wireless communication protocols, such as LTE Advanced and/or the like as well as similar wireless communication protocols that may be subsequently developed.

It is understood that the processor 20 may include circuitry for implementing audio/video and logic functions of apparatus 10. For example, the processor 20 may comprise a digital signal processor device, a microprocessor device, an analog-to-digital converter, a digital-to-analog converter, and/or the like. Control and signal processing functions of the apparatus 10 may be allocated between these devices according to their respective capabilities. The processor 20 may additionally comprise an internal voice coder (VC) 20a, an internal data modem (DM) 20b, and/or the like. Further, the processor 20 may include functionality to operate one or more software programs, which may be stored in memory. In general, processor 20 and stored software instructions may be configured to cause apparatus 10 to perform actions. For example, processor 20 may be capable of operating a connectivity program, such as a web browser. The connectivity program may allow the apparatus 10 to transmit and receive web content, such as location-based content, according to a protocol, such as wireless application protocol, WAP, hypertext transfer protocol, HTTP, and/or the like.

Apparatus 10 may also comprise a user interface including, for example, an earphone or speaker 24, a ringer 22, a microphone 26, a display 28, a user input interface, and/or the like, which may be operationally coupled to the processor 20. The display 28 may, as noted above, include a touch sensitive display, where a user may touch and/or gesture to make selections, enter values, and/or the like. The processor 20 may also include user interface circuitry configured to control at least some functions of one or more elements of the user interface, such as the speaker 24, the ringer 22, the microphone 26, the display 28, and/or the like. The processor 20 and/or user interface circuitry comprising the processor 20 may be configured to control one or more functions of one or more elements of the user interface through computer program instructions, for example, software and/or firmware, stored on a memory accessible to the processor 20, for example, volatile memory 40, non-volatile memory 42, and/or the like. The apparatus 10 may include a battery for powering various circuits related to the mobile terminal, for example, a circuit to provide mechanical vibration as a detectable output. The user input interface may comprise devices allowing the apparatus 20 to receive data, such as a keypad 30 (which can be a virtual keyboard presented on display 28 or an externally coupled keyboard) and/or other input devices.

As shown in FIG. 4, apparatus 10 may also include one or more mechanisms for sharing and/or obtaining data. For example, the apparatus 10 may include a short-range radio frequency (RF) transceiver and/or interrogator 64, so data may be shared with and/or obtained from electronic devices in accordance with RF techniques. The apparatus 10 may include other short-range transceivers, such as an infrared (IR) transceiver 66, a Bluetooth (BT) transceiver 68 operating using Bluetooth wireless technology, a wireless universal serial bus (USB) transceiver 70, a Bluetooth Low Energy transceiver, a ZigBee transceiver, an ANT transceiver, a cellular device-to-device transceiver, a wireless local area link transceiver, and/or any other short-range radio technology. Moreover, in some example embodiments, the short-range transceiver may transmit advertisements (which may include the location change disclosed herein) generated by processor 20. Apparatus 10 and, in particular, the short-range transceiver may be capable of transmitting data to and/or receiving data from electronic devices within the proximity of the apparatus, such as within 10 meters, for example. The apparatus 10 including the WiFi or wireless local area networking modem may also be capable of transmitting and/or receiving data from electronic devices according to various wireless networking techniques, including 6LoWpan, Wi-Fi, Wi-Fi low power, WLAN techniques such as IEEE 802.11 techniques, IEEE 802.15 techniques, IEEE 802.16 techniques, and/or the like.

The apparatus 10 may comprise memory, such as a subscriber identity module (SIM) 38, a removable user identity module (R-UIM), an eUICC, an UICC, and/or the like, which may store information elements related to a mobile subscriber. In addition to the SIM, the apparatus 10 may include other removable and/or fixed memory. The apparatus 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices, for example, hard disks, floppy disk drives, magnetic tape, optical disc drives and/or media, non-volatile random access memory (NVRAM), and/or the like. Like volatile memory 40, non-volatile memory 42 may include a cache area for temporary storage of data. At least part of the volatile and/or non-volatile memory may be embedded in processor 20. The memories may store one or more software programs, instructions, pieces of information, data, and/or the like which may be used by the apparatus for performing functions of the user equipment/mobile terminal. The memories may comprise an identifier, such as an international mobile equipment identification (IMEI) code, capable of uniquely identifying apparatus 10. The functions may include one or more of the operations disclosed with respect to process 200 and/or 300, as well as other aspects disclosed herein. The memories may comprise an identifier, such as an international mobile equipment identification (IMEI) code, capable of uniquely identifying apparatus 10. In the example embodiment, the processor 20 may be configured using computer code stored at memory 40 and/or 42 to operations disclosed herein with respect to process 200, and/or 300 as well as other aspects disclosed herein.

Some of the embodiments disclosed herein may be implemented in software, hardware, application logic, or a combination of software, hardware, and application logic. The software, application logic, and/or hardware may reside on memory 40, the control apparatus 20, or electronic components, for example. In some example embodiment, the application logic, software or an instruction set is maintained on any one of various conventional computer-readable media. In the context of this document, a "computer-readable medium" may be any non-transitory media that can contain, store, communicate, propagate or transport the instructions for use by or in connection with an instruction execution system, apparatus, or device, such as a computer or data processor circuitry, with examples depicted at FIG. 4, computer-readable medium may comprise a non-transitory computer-readable storage medium that may be any media that can contain or store the instructions for use by or in connection with an instruction execution system, apparatus, or device, such as a computer.

FIG. 5 depicts an example implementation of a network node 500, such as for example resource control node 190, a small cell base station (including control node 190), and the like. The network node 500 may include one or more antennas 520 configured to transmit via a downlink and configured to receive uplinks via the antenna(s) 520. The network node 500 may further include a plurality of radio interfaces 540 coupled to the antenna 520. The radio interfaces may correspond one or more of the following: Long Term Evolution (LTE, or E-UTRAN), Third Generation (3G, UTRAN, or high speed packet access (HSPA)), Global System for Mobile communications (GSM), wireless local area network (WLAN) technology, such as for example 802.11 WiFi and/or the like, Bluetooth, Bluetooth low energy (BT-LE), near field communications (NFC), and any other radio technology. The radio interface 540 may further include other components, such as for example filters, converters (for example, digital-to-analog converters and the like), mappers, a Fast Fourier Transform (FFT) module, and the like, to generate symbols for a transmission via one or more downlinks and to receive symbols (for example, via an uplink). The network node 500 may further include one or more processors, such as for example processor 530, for controlling the network node 500 and for accessing and executing program code stored in memory 535. In some example embodiments, memory 535 includes code, which when executed by at least one processor causes one or more of the operations described herein with respect to the resource control node, such as for example identifying clusters, identifying groups, grouping small cells into groups, and/or other operations associated with the resource control node disclosed herein including process 200, although other aspects including those at process 300 may be performed by the resource control node as well.

Without in any way limiting the scope, interpretation, or application of the claims appearing below, a technical effect of one or more of the example embodiments disclosed herein is enhanced resource allocation for small cells.

If desired, the different functions discussed herein may be performed in a different order and/or concurrently with each other. Furthermore, if desired, one or more of the above-described functions may be optional or may be combined. Although various aspects of the invention are set out in the independent claims, other aspects of the invention comprise other combinations of features from the described embodiments and/or the dependent claims with the features of the independent claims, and not solely the combinations explicitly set out in the claims. It is also noted herein that while the above describes example embodiments, these descriptions should not be viewed in a limiting sense. Rather, there are several variations and modifications that may be made without departing from the scope of the present invention as defined in the appended claims. Other embodiments may be within the scope of the following claims. The term "based on" includes "based on at least." The use of the phase "such as" means "such as for example" unless otherwise indicated.

What is claimed:

1. A method comprising:
receiving, at a self-optimizing network operation and maintenance node, one or more traffic characteristics for small cells of a cluster;
determining, at the self-optimizing network operation and maintenance node and based on the received one or more traffic characteristics, a first resource allocation group and a second resource allocation group, the first resource allocation group including first small cells in the cluster and the second resource allocation group including second small cells in the cluster, the first small cells of the first resource allocation group having a same or similar first traffic demand characteristic, and the second small cells of the second resource allocation group having a same or similar second traffic demand characteristic which is different from the first traffic demand characteristic,
wherein the first traffic characteristic includes a resource utilization rate for the first small cells; and
allocating, at the self-optimizing network operation and maintenance node and based on at least the first traffic demand characteristic and inter-cell interference among the first small cells, to the first resource allocation group of first small cells at least a partially overlapping resource in a time domain and/or a frequency domain.

2. The method of claim 1, wherein the cluster includes overlapping small cells and other small cells that do not overlap with respect to coverage area.

3. The method of claim 1, wherein the first traffic demand characteristic includes a resource utilization rate for a traffic type.

4. The method of claim 1, further comprising: allocating, at the self-optimizing network operation and maintenance node and based on at least the second traffic demand characteristic and inter-cell interference among the second small cells, to the second resource allocation group of second small cells at least another partially overlapping resource in a time domain and/or a frequency domain.

5. The method of claim 1, wherein the allocating further comprises sharing, by at least two small cell base stations serving the first small cells, at least the partially overlapping resource among the first small cells.

6. The method of claim 5, wherein the size of the partially overlapping resource is allocated based on at least the first traffic demand characteristic of the first small cells.

7. An apparatus, comprising:
at least one processor; and
at least one memory including computer program code, the at least one memory and the computer program code configured to, with the at least one processor, cause the apparatus to at least:
receive one or more traffic characteristics for small cells of a cluster;
determine, based on the received one or more traffic characteristics, a first resource allocation group and a second resource allocation group, the first resource allocation group including first small cells in the cluster and the second resource allocation group including second small cells in the cluster, the first small cells of the first resource allocation group having a same or similar first traffic demand characteristic, and the second small cells of the second resource allocation group having a same or similar second traffic demand characteristic which is different from the first traffic demand characteristic, wherein the first traffic characteristic includes a resource utilization rate for the first small cells; and allocate, based on at least the first traffic demand characteristic and inter-cell interference among the first small cells, to the first resource allocation group of first small cells at least a partially overlapping resource in a time domain and/or a frequency domain.

8. The apparatus of claim 7, wherein the cluster includes overlapping small cells and other small cells that do not overlap with respect to coverage area, and wherein the apparatus comprises or is comprised in a self-optimizing network operation and maintenance node.

9. The apparatus of claim 7, wherein the first traffic demand characteristic includes a resource utilization rate for a traffic type.

10. The apparatus of claim 7, wherein the apparatus is further caused to at least allocate, based on at least the second traffic demand characteristic and inter-cell interference among the second small cells, to the second resource allocation group of second small cells at least another partially overlapping resource in a time domain and/or a frequency domain.

11. The apparatus of claim 7, wherein the allocation further comprises sharing, by at least two small cell base stations serving the first small cells, at least the partially overlapping resource among the first small cells.

12. The apparatus of claim 11, wherein the size of the partially overlapping resource is allocated based on at least the first traffic demand characteristic of the first small cells.

13. A non-transitory computer-readable medium including computer program code which when executed by at least one processor causes operations comprising:

receiving, at a self-optimizing network operation and maintenance node, one or more traffic characteristics for small cells of a cluster;

determining, at the self-optimizing network operation and maintenance node and based on the received one or more traffic characteristics, a first resource allocation group and a second resource allocation group, the first resource allocation group including first small cells in the cluster and the second resource allocation group including second small cells in the cluster, the first small cells of the first resource allocation group having a same or similar first traffic demand characteristic, and the second small cells of the second resource allocation group having a same or similar second traffic demand characteristic which is different from the first traffic demand characteristic, wherein the first traffic characteristic includes a resource utilization rate for the first small cells; and allocating, at the self-optimizing network operation and maintenance node and based on at least the first traffic demand characteristic and inter-cell interference among the first small cells, to the first resource allocation group of first small cells at least a partially overlapping resource in a time domain and/or a frequency domain.

* * * * *